April 8, 1958 N. L. PETERSON 2,830,249
SERVOMECHANISMS
Filed March 19, 1954 2 Sheets-Sheet 1

Inventor
Norman L. Peterson
By W. E. Lyon
Attorney

April 8, 1958 — N. L. PETERSON — 2,830,249
SERVOMECHANISMS
Filed March 19, 1954 — 2 Sheets-Sheet 2

$$K_{30}A_{28}\left[(\omega_1-\omega_2)+\int_{T1}^{T2} A_{20}(1-F)(\omega_1-\omega_2)\,dt + \frac{d(\omega_1-\omega_2)}{dt}\right]$$

Inventor
Norman L. Peterson
By W. E. Lyon
Attorney

United States Patent Office 2,830,249
Patented Apr. 8, 1958

2,830,249

SERVOMECHANISMS

Norman L. Peterson, Wauwatosa, Wis., assignor to Cutler-Hammer, Inc., Milwaukee, Wis., a corporation of Delaware Application March 19, 1954, Serial No. 417,389

7 Claims. (Cl. 318—307)

This invention relates to servomechanisms and it relates particularly to closed-loop motor speed regulating systems.

A primary object is to provide a speed control servomechanism which has a very high speed of response and affords a high degree of accuracy of control.

Another object is to provide an improved positioning servomechanism.

Other objects and advantages of the invention will hereinafter appear.

Certain of these objects are realized by the provision of a servomechanism, including means for affording and combining control signals which are proportional to error and the time integral of error, and, especially when the load has high inertia, to develop and combine with said signals a signal proportional to the time differential of error.

One embodiment of the invention is shown in the accompanying drawings, it being understood that various equivalent signal generating and detecting devices may be substituted for those shown, and that various other modifications may be made in the embodiment illustrated without departing from the spirit of the invention or the scope of the appended claims.

Figure 1:
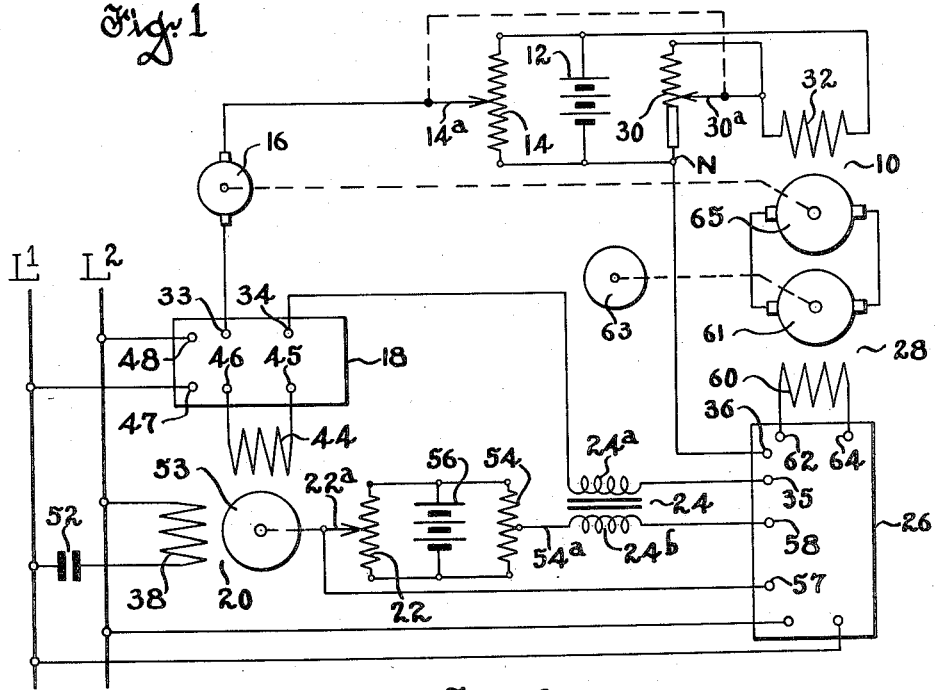
Figure 2:
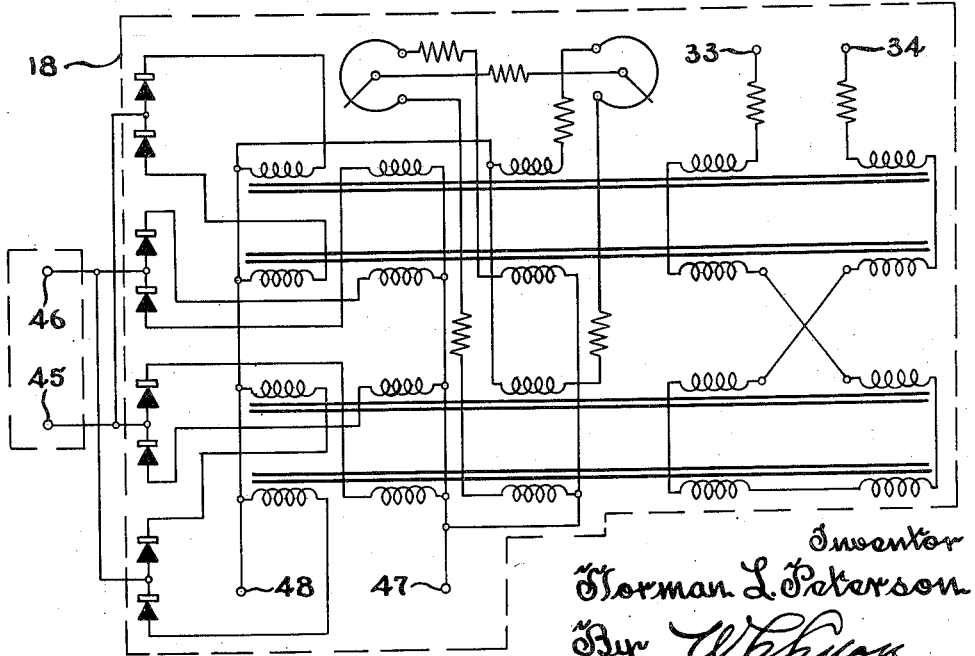
Figure 3:
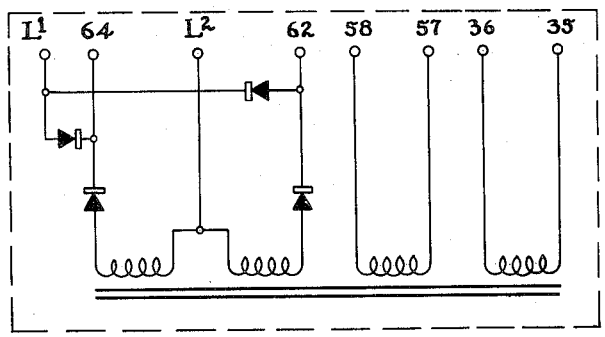
Figure 4:
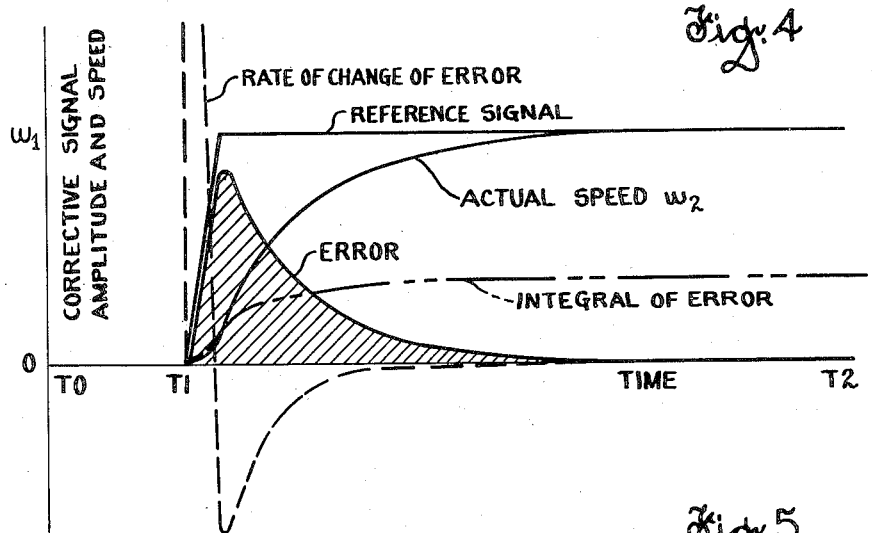
Figure 5:
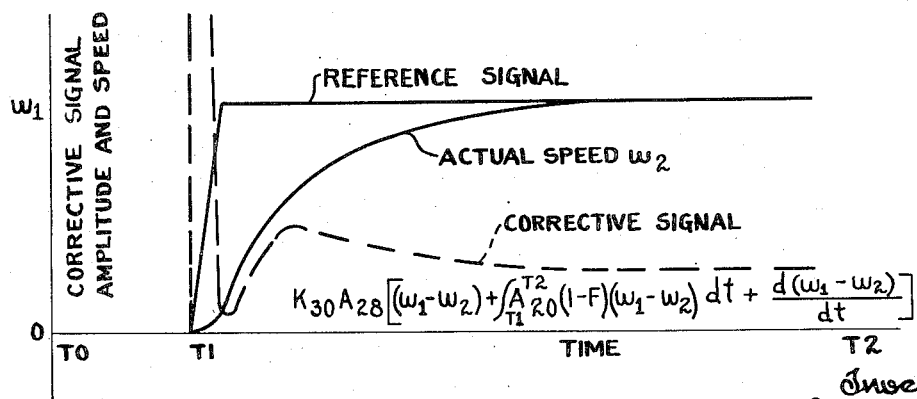

In the drawings, Figure 1 is a partly diagrammatic and partly schematic illustration of a control system embodying the invention, Figs. 2 and 3 are diagrammatic illustrations of amplifiers 18 and 26, respectively, of Fig. 1, and Figs. 4 and 5 graphically illustrate an operating condition of the system shown in Fig. 1.

Referring to Fig. 1, there is shown a motor 10 the speed of which is to be controlled by the regulator which comprises a reference voltage source represented by unidirectional voltage source 12 and potentiometer 14, a speed measuring tachometer 16, a magnetic amplifier 18, a two-phase induction motor 20, a potentiometer 22, a transformer 24, a magnetic amplifier 26 and a generator 28.

Potentiometer 14 is connected in parallel with the series circuit combination of a rheostat 30 and the field 32 of motor 10 across unidirectional voltage source 12. Taps 14ᵃ and 30ᵃ, of the potentiometer 14 and rheostat 30 respectively, are adjustable simultaneously. The voltage drop across potentiometer 14 from tap 14ᵃ to point N at one end of source 12 is proportional, for setting of tap 14ᵃ, to the desired speed of motor 10. Rheostat 30 has substantially zero resistance over a portion of its length and has a linearly increasing resistance characteristic thereafter. Full field is applied to motor 10 at speeds below the base speed of the motor and the field is weakened to operate the motor at higher speeds.

Connected in a loop circuit from tap 14ᵃ of potentiometer 14 and point N are: tachometer 16, signal input terminals 33 and 34 of amplifier 18, primary winding 24ᵃ of transformer 24 and signal input terminals 35 and 36 of amplifier 26. Tachometer 16 is coupled to the shaft of motor 10 and develops a voltage which is proportional in magnitude to the actual speed of motor 10 and has polarity to oppose the desired speed voltage appearing across potentiometer 14 from tap 14ᵃ to point N. The voltage applied to terminals 33, 34 and 35, 36 of amplifiers 18 and 26, respectively, is proportional to the difference between the actual and desired speeds of motor 10.

One phase winding 38 of motor 20 is connected across a pair of alternating current supply lines L1 and L2 in series with a 90 degree phase-shift capacitor 52. The other phase winding 44 is connected to the alternating signal output terminals 45 and 46 of amplifier 18. Alternating current power for amplifier 18 is supplied from lines L1 and L2 at terminals 47 and 48. The capacitor 52 acts to shift the phase of the alternating input signal to winding 38 approximately 90 electrical degrees out of phase with the voltage applied to winding 44 of motor 20.

Amplifier 18, which may be an amplifier of the type shown in Fig. 2, acts to apply an alternating voltage to winding 44 of motor 20 which differs in phase by about plus or minus 90 electrical degrees from the voltage applied to winding 38 and which varies in amplitude in accordance with the signal applied to input terminals 33 and 34. The rotor 53 of motor 20 rotates at a rate determined by the magnitude of the input signal at terminals 33 and 34 and it rotates whenever and for the period during which the actual speed of motor 10 differs from the desired speed thereof. The direction of rotation of the motor depends upon the polarity of the error signal applied to terminals 33 and 34 and it reverses when the sign of the error is reversed.

Rotor 53 is mechanically connected to the adjustable tap 22ᵃ of potentiometer 22. This potentiometer and a voltage divider 54 are connected in parallel with a suitable unidirectional voltage source such as the battery 56. The mid-voltage tap 54ᵃ of divider 54 and tap 22ᵃ are connected to the unidirectional signal input terminals 57 and 58, respectively, of amplifier 26. When tap 22ᵃ is at the point of potentiometer 22 corresponding to the position of the tap 54ᵃ of potentiometer 54, zero signal is applied at terminals 57, 58 but when tap 22ᵃ is moved from that point, the signal applied at terminals 57, 58 is proportional to the degree of movement and of a polarity dependent upon the direction in which tap 22ᵃ is moved.

The position of tap 22ᵃ represents, at any time, the sum of the product of the magnitude and duration of the error between actual and desired motor speeds for all increments of time up to said time. Neglecting the effect of transformer 24, the voltage applied at terminals 57, 58 represents the time integral of the error between the actual and desired speeds of motor 10.

The secondary winding 24ᵇ of transformer 24 is connected in series in the line between tap 54ᵃ and terminal 58. Direct current flows in primary winding 24ᵃ. The magnitude of this current is proportional to error (i. e., the difference between actual motor speed and desired motor speed as determined by the setting of tap 14ᵃ of potentiometer 14) and its polarity is determined by the sign of the error. When error changes, a voltage proportional to the rate-of-change or the differential of error and of polarity determined by sign of the error is induced in secondary winding 24ᵇ. The two-phase induction motor 20 is provided with high rotor resistance so that the speed-torque curve of the motor is substantially a straight line of negative slope. Such a motor exhibits a viscous damping characteristic which is similar to that of an ordinary motor coupled to its load through a fluid coupling.

Thus the resultant signal applied to amplifier 26 is proportional to the error, to the time integral of the viscous damped error, and to the time differential of error. Neglecting the time constants of amplifier 18 and motor 20 and other components and defining the gain of amplifier 18 as $A_{18}$, of motor 20 as $A_{20}$ and of transformer 24 as $A_{24}$, and the setting of 14$^a$ as $w1$ and the speed of motor 10 as $w2$, F designates viscous damping introduced by motor 20.

Amplifier 26 input signal =

$$(w_1-w_2)+\int_{T1}^{T2} A20(w_1-w_2)(1-F)dt+d(w_1-w_2)/dt$$

The magnetic amplifier 26 supplies power to field winding 60 of generator 28. The generator armature 61 is driven at constant speed by its prime mover 63. The armature 61 is connected in loop circuit with the motor armature 65. Assuming the gain through amplifier 26 from terminals 35, 36 to output terminals 62, 64 to be equal to the gain from terminals 57, 58 to terminals 62, 64 and the combined gain of amplifier 26 and generator 28 to be $A_{28}$. And further assuming that the effect of field 32 upon the speed of motor 10 is given by $K_{30}$, the equation for the entire system is given by:

$$J_{10}\frac{dw_2}{dt}=K_{30}\left[A_{28}(w_1-w_2)+A_{28}\int_{T1}^{T2}A20(w_1-w_2)(1-F)dt+A_{28}\frac{d(w_1-w_2)}{dt}\right]$$

where $J_{10}$ is the inertia of motor 10 and its load (not shown).

In practice F, $A_{28}$, $A_{20}$ and $K_{30}$ are non-linear functions. The equation has not been expanded because it would then define only one particular system and the complexity of the equation would outweigh any advantage in showing it.

The simplified equation illustrates that the energy supplied to motor 10 and its load varies as the sum of: error, the integral of error, and the differential of error. Although the integral of error and the differential of error are opposed functions, their respectively corresponding signals are maximum and minimum at different times under various error conditions so that these signals affect the motor torque separately.

To illustrate the operation of the system in simple terms, it is assumed that motor 10 is at rest and that the reference voltage is zero as illustrated at T0 in Fig. 4 and Fig. 5. At time T1 the reference voltage is changed rapidly to a value corresponding to desired motor speed $w_1$. Because of its own inertia and that of its load, motor 10 cannot accelerate to speed $w_1$ as rapidly as the reference voltage is increased. Therefor, at the instant the reference voltage is increased, the difference between actual and desired speed or error increases very rapidly. The time differential of this change is very great and, accordingly, a very large corrective signal is applied to accelerate the motor. This signal is aided by a smaller signal which is proportional to error. The motor accelerates very rapidly. When the motor speed increases sufficiently so that error no longer increases, the time differential of error falls to zero. Then, as error is increased, the differential of error changes sign and acts to oppose motor acceleration and prevent the motor speed from "over-shooting" the reference speed $w_1$. As motor acceleration is reduced, the time differential of error signal becomes smaller and the error signal becomes dominant to control the motor until desired speed is approached.

The shaded area under the error curve is plotted (in Fig. 4) against time and is the time integral of error. This signal increases with time and when error (and time differential of error) are reduced to zero and all inertia effects have been dissipated it has a value corresponding exactly to the signal required to overcome the friction load on the system and maintain motor speed constant. If this time integral of error signal were not provided, the control signal required to do the useful work would necessarily be supplied as an error signal and a steady state speed error would exist.

It will be apparent that if the reference signal thereafter is reduced to correspond to an intermediate speed the integral of error signal must be overcome, in part, before corrective action can occur. If this were the only control signal, the error would necessarily become large before a proper corrective signal could be developed. By adding a signal proportional to error to the time integral of error signal the response time of the system is improved. If the time differential of error signal also is added, the response can be made very rapid without danger of excessive hunting.

I claim:

1. In a speed regulating system for an electric motor having a field winding and an armature winding and being of a type in which speed can be controlled by variation in the energization of either or both of said windings, in combination, means for providing a signal proportional to desired motor speed and energizing one of said windings as a function of the desired speed of said motor, means responsive to said signal and to actual motor speed for providing a difference signal proportional to the difference between actual and desired speeds, means responsive to said difference signal to provide a signal proportional to the time integral of the difference signal, means independent of the last mentioned means and also responsive to said difference signal for energizing another of said windings as a function of said difference signal, and means responsive to said time integral signal for energizing said another winding as a function of said time integral signal.

2. In a speed regulating system for an electric motor having a field winding and an armature winding and being of a type in which speed can be controlled by variation in the energization of either or both of said windings, in combination, means for providing a signal proportional to desired motor speed, means responsive to said signal and to actual motor speed for providing a difference signal proportional to the difference between actual and desired speeds, means responsive to said difference signal to provide a signal proportional to the time integral of the difference signal, means connected to one of said windings of said motor and being responsive to said difference signal and said integral signal for energizing said one of said windings as a function of said difference signal and said integral signal, means for energizing the other of said windings as a function of the desired speed of said motor, and means responsive to said difference signal for providing a signal proportional to the time rate of change of said difference signal, said means responsive to said difference and integral signals also being responsive to said rate of change signal for energizing said one of said windings as a function of said rate of change signal.

3. In a speed regulating system for an electric motor, said motor having a winding and being of a type in which speed can be controlled by variation of the energization of said winding, in combination, means for providing an adjustable D. C. signal representing desired speed of the motor, means responsive to said D. C. signal and to actual speed of the motor to provide a D. C. difference signal as a function of the difference between actual and desired motor speeds, means responsive to said difference signal to provide an A. C. signal proportional thereto, a two-phase winding induction motor having one phase winding connected to said means last mentioned for energization by said A. C. signal and being responsive to said A. C. signal to rotate at a speed proportional to the magnitude of said A. C. signal, variable means responsive to rotation of said two-phase motor to provide a D. C. signal proportional to the time integral of said A. C. signal, signal responsive means, means independent of said variable means and including said signal responsive means for energizing said winding of said first mentioned motor as a function of said difference signal, and means for applying said time integral signal through said signal responsive means to energize said winding of said first mentioned motor as a function of said time integral signal.

4. In a speed regulating system for an electric motor, said motor having a winding and being of a type in which speed can be controlled by variation of the energization of said winding, in combination, means for providing a D. C. signal representing desired speed of the motor, means responsive to said D. C. signal and actual speed of the motor to provide a D. C. difference signal proportional to the difference between actual and desired motor speeds, means responsive to said difference signal to provide an A. C. signal proportional thereto, a two-phase winding induction motor having one phase winding connected to said means last mentioned for energization by said A. C. signal and being responsive to said A. C. signal to rotate at a speed proportional to the magnitude of said A. C. signal, means responsive to rotation of said two-phase motor to provide a D. C. signal proportional to the time integral of said A. C. signal, means connected to said winding of said motor first mentioned and being responsive to said D. C. difference signal and said D. C. integral signal to energize said winding of said motor first mentioned as a function of said D. C. difference signal and said D. C. integral signal, and means responsive to said D. C. difference signal for providing a signal proportional to the time rate of change of said D. C. difference signal, said means responsive to said D. C. difference signal and said D. C. integral signal also being responsive to said rate of change signal for energizing said winding of said motor first mentioned as a function of said rate of change signal.

5. In a speed regulating system for an electric motor, said motor having a plurality of windings and affording speed adjustment and control by variation of the energization of said windings, in combination, means for providing an adjustable signal representing desired speed of the motor to one of said windings, means responsive to said signal and actual speed of the motor to provide a difference signal proportional to the difference between actual and desired motor speeds, means responsive to said difference signal for providing a signal proportional to the time rate of change of said difference signal, and means responsive to said difference signal and said rate of change signal for energizing another one of said motor windings as a function thereof.

6. In a speed regulating system for an electric motor, said motor having at least one winding and affording speed adjustment and control by variation of the energization of said winding, in combination, means for providing a D. C. signal representing desired speed of the motor, means responsive to said D. C. signal and actual speed of the motor to provide a D. C. difference signal proportional to the difference between actual and desired motor speeds, means responsive to said difference signal to provide a signal proportional to the time integral of the difference signal, means responsive to said difference signal to provide a signal proportional to the time rate of change of said difference signal, and means responsive to said time integral and rate of change signals for energizing said winding of said motor as a function thereof.

7. The combination defined in claim 3 in which the controlled electric motor is provided with a second winding whose energization may be changed to control the speed of the motor and including means for energizing said second winding as a function of the desired speed of the motor.

References Cited in the file of this patent

UNITED STATES PATENTS

| | | |
|---|---|---|
| 2,517,353 | Rendel | Aug. 1, 1950 |
| 2,524,051 | Goertz | Oct. 3, 1950 |
| 2,525,967 | Smoot | Oct. 17, 1950 |
| 2,551,620 | Meinema | May 8, 1951 |
| 2,629,846 | Montgomery et al. | Feb. 24, 1953 |
| 2,644,124 | Broadbent et al. | June 30, 1953 |